US012389821B2

(12) United States Patent
Hilbert et al.

(10) Patent No.: US 12,389,821 B2
(45) Date of Patent: Aug. 19, 2025

(54) GRANULE PORTIONING DEVICE FOR AN AGRICULTURAL DISPENSING MACHINE

(71) Applicant: AMAZONEN-WERKE H. DREYER SE & CO. KG, Hasbergen (DE)

(72) Inventors: Florenz Hilbert, Emsdetten (DE); Stephan Teckemeyer, Lotte (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 183 days.

(21) Appl. No.: 18/275,912

(22) PCT Filed: Mar. 3, 2022

(86) PCT No.: PCT/EP2022/055355
§ 371 (c)(1),
(2) Date: Aug. 4, 2023

(87) PCT Pub. No.: WO2022/194560
PCT Pub. Date: Sep. 22, 2022

(65) Prior Publication Data
US 2024/0114824 A1     Apr. 11, 2024

(30) Foreign Application Priority Data
Mar. 17, 2021   (DE) .................... 10 2021 106 439.2

(51) Int. Cl.
*A01C 15/00*       (2006.01)
*G01F 11/28*       (2006.01)
(52) U.S. Cl.
CPC .......... *A01C 15/001* (2013.01); *G01F 11/282* (2013.01)

(58) Field of Classification Search
CPC ........ A01C 15/001; A01C 7/18; G01F 11/282
See application file for complete search history.

(56) References Cited

U.S. PATENT DOCUMENTS 9,587,972 B2 *  3/2017  Landau .................. B01F 27/82
11,785,882 B2 * 10/2023  Hilbert .................. A01C 7/102
                                                          111/14
(Continued)

FOREIGN PATENT DOCUMENTS

DE         6914341 U     4/1969
DE    102019117555 A1   12/2020
(Continued)

OTHER PUBLICATIONS

Reininghaus, F., "International Search Report", mailed Jun. 22, 2022, issued in corresponding PCT application PCT/EP2022/055355, filed Mar. 3, 2021, including English translation of the International Search Report.
(Continued)

*Primary Examiner* — Michael Collins
(74) *Attorney, Agent, or Firm* — PERRY + CURRIER INC.

(57) ABSTRACT

The invention relates to a granule portioning device for an agricultural dispensing machine, comprising a portioning chamber for forming granule portions and a portioning rotor located in the portioning chamber and having at least one contact body, the contact body being designed to move along a circular path during a rotational movement of the portioning rotor and to combine granules located in the portioning chamber into a granule portion.

15 Claims, 12 Drawing Sheets

(56) References Cited

U.S. PATENT DOCUMENTS

| | | | | |
|---|---|---|---|---|
| 12,052,946 B2* | 8/2024 | Radeke | ................... | A01C 7/123 |
| 12,085,435 B2* | 9/2024 | Wien | ....................... | G01F 11/24 |
| 2013/0092705 A1* | 4/2013 | Simmons | ................ | A47J 47/04 |
| | | | | 222/323 |
| 2016/0044860 A1* | 2/2016 | Haselhoff | ................ | A01C 7/04 |
| | | | | 111/183 |
| 2016/0044861 A1* | 2/2016 | Haselhoff | .............. | A01C 7/128 |
| | | | | 111/183 |
| 2017/0156255 A1* | 6/2017 | Haselhoff | .............. | G01F 15/00 |

FOREIGN PATENT DOCUMENTS

| | | | |
|---|---|---|---|
| DE | 102012105081 A1 | 12/2023 | |
| EP | 3340763 B1 | 4/2020 | |

OTHER PUBLICATIONS

German Office Action, mailed Dec. 13, 2021, issued in corresponding German Patent Application No. 102021106439.2, filed Mar. 17, 2021.

\* cited by examiner

GRANULE PORTIONING DEVICE FOR AN AGRICULTURAL DISPENSING MACHINE

The invention relates to a granulate portioner for an agricultural dispensing device, an agricultural dispensing device, and a method for producing granulate portions.

In a granulate portioner with a portioning rotor arranged in a portioning chamber, which combines granulate grains located in the portioning chamber to form a granulate portion, jamming can occur between the portioning rotor and granules. Such jamming can impair portioning operation and cause damage to the granulate portioner.

Gap areas between the portioning rotor and the wall of the portioning chamber cannot be completely and permanently avoided due to manufacturing tolerances and wear. Since the granules can have different sizes, jamming between the portioning rotor and the granules can occur if the gap dimensions differ.

To avoid wear problems during the use of a corresponding granulate portioner, the contact bodies of the portioning rotor, which move on a circular path, must be made of a dimensionally stable material, for example hard metal. Elastically deformable contact bodies or contact bodies with elastically deformable outer edges, for example contact bodies with lobes or brushes, are unsuitable for closure reasons.

The object underlying the invention is thus to prevent or at least reduce jamming between the portioning rotor of a granulate portioner and granules.

The object is solved by a granulate portioner of the type mentioned above, wherein the portioning rotor of the granulate portioner according to the invention has an escape mechanism which allows the contact body to temporarily leave the circular path during the rotational movement of the portioning rotor in order to break up and/or avoid jamming between the portioning rotor and granulate grains.

The deflection mechanism allows the contact body to make swerving movements to initiate and/or prevent jamming between the portioning rotor and the granules. The deflection mechanism can also be used to compensate for manufacturing tolerances that lead to unintentional gaps within the granulate portioner. In addition, the deflection mechanism also compensates for wear effects that lead to dimensional deviations in the components of the granulate portioner. The deflection mechanism thus effectively prevents jamming-related functional impairment and damage to the granulate portioner.

The portioning chamber of the granulate portioner is preferably arranged in a housing of the granulate portioner. The portioning rotor is preferably rotationally drivable. For this purpose, the granulate portioner is preferably equipped with a rotor drive. The rotor drive can be an electric, pneumatic or hydraulic drive. The circular path on which the contact body moves during the rotational movement of the portioning rotor is preferably a circular path. The granules, which are portioned with the granulate portioner, are preferably fertilizer. Consequently, the granulate portioner is preferably a fertilizer portioner.

The swerving movements of the contact body are preferably caused by the contact of the contact body with granules. Jammed granules block or impair the rotational movements of the portioning rotor, thus exerting a blocking force on the contact body. This blocking force emanating from a granule causes the swerving movement of the contact body, which deflects the contact body.

In a preferred embodiment of the granule portioner according to the invention, the deflection mechanism allows a radial swerving movement of the contact body to leave the orbit during a rotational movement of the portioning rotor. Alternatively or additionally, the deflection mechanism allows an axial swerving movement of the contact body to leave the circular path during a rotational movement of the portioning rotor. Thus, the deflection mechanism may also permit a swerving movement of the contact body, which comprises a radial component and an axial component. The deflection mechanism allows the contact body to temporarily leave the circular path in the radial direction and/or in the axial direction during a rotational movement of the portioning rotor to break up and/or prevent jamming between the portioning rotor and granules. The contact body performs a swerving movement in the radial direction, in particular inwards or towards the axis of rotation of the portioning rotor, if granules are located in a gap between the, in particular cylindrical or v-shaped, circumferential surface, which radially bounds the portioning chamber at least in sections, and a radially outer edge of the contact body. If the contact body performs a swerving movement in the radial direction inwards or towards the axis of rotation of the portioning rotor, the radial extension of the portioning rotor is reduced and thus also the diameter. The contact body performs a swerving movement in the axial direction when granules are located in a gap between a side wall, which at least in sections laterally delimits the portioning chamber, and a lateral edge of the contact body.

The granulate portioner according to the invention is further advantageously embodied in that the deflection mechanism has a radial spring connected to the contact body, which allows the radial swerving movement of the contact body to leave the circular path during a rotational movement of the portioning rotor. The radial spring is positioned between the rotor mounting on the rotor drive and the contact body. The radial spring holds the contact body movably deflectable against a restoring force in a reference position in which the contact body is on the circular path. The deflection mechanism can have a stop which limits the restoring movement of the contact body caused by the radial spring and/or displacements due to centrifugal forces acting on the contact body. The stop ensures that the contact body is moved back to the circular path after an swerving movement and is held there in an evasive manner towards the inside, and preferably not towards the outside.

It is furthermore advantageous to have a granulate portioner according to the invention, wherein the portioning rotor comprises at least one portioning wing, wherein the portioning wing has two contact bodies movable relative to one another, wherein the deflection mechanism permits axial swerving movements of the two contact bodies, by means of which the two contact bodies, preferably independently of one another, can temporarily leave their circular path during a rotational movement of the portioning rotor. The two contact bodies can overlap in portions in the axial direction. A swerving movement of a contact body in the axial direction can temporarily cause a reduction in the overall width of the contact surface bond, resulting in gap formation or gap propagation. A lateral outer edge of a first contact body preferably runs along a first side wall of the portioning chamber. A lateral outer edge of a second contact body preferably runs along a second side wall of the portioning chamber. The division into two parts avoids a collision with the wall when a contact body performs an swerving movement, since the respective contact body can swivel in the direction of rotation in front of or behind the corresponding other contact body.

In another embodiment of the granulate portioner according to the invention, the contact body has elastically deformable or resiliently movable side cheeks on one or both sides, which allow an axial swerving movement of the contact body in the direction of a side wall of the portioning chamber to continue even after a side cheek has come into contact with a side wall. For example, the contact body may have a blade shape. The side cheeks of the contact body can be beveled and/or designed from an elastic material, for example spring steel, so that the beveled side cheeks can be resiliently pressed inward. To protect against wear, hard metal flakes or other wear-reducing bodies can be brazed onto the elastic material. The side cheeks of the contact body can be rotatably mounted and pulled against a stop by a cheek spring. Preferably, a stop against the direction of rotation of the portioning rotor prevents the width of the paddle from increasing due to the force exerted by the granules on the blade. Preferably, the blade shape does not comprise a back wall.

It is further advantageous to have a granulate portioner according to the invention in which the portioning chamber is bounded radially and/or axially at least in portions in the environment of the circular path by an at least partially circumferential shell surface. The portioning rotor is preferably arranged in the portioning chamber in such a manner that a radial gap results between the radially outer edge of the contact body and a partial area of the shell surface which radially bounds the portioning chamber at least in sections during the rotational movement of the rotor. Alternatively or additionally, the portioning rotor is arranged in the portioning chamber in such a manner that axial gaps are formed between the axially outer edges of the contact body and partial areas of the shell surface which axially bound the portioning chamber at least in sections during the rotational movement of the rotor. The portioning rotor can further be arranged in the portioning chamber in such a manner that the gap width of the radial gap and/or the axial gaps changes when the contact body moves out of the way. The shell surface and/or the contact body can each have a trapezoidal, V-shaped or W-shaped cross-section. The outer edges of the contact body and the shell surface preferably extend parallel to one another.

In a further preferred embodiment of the granule portioner according to the invention, the portioning rotor is arranged in the portioning chamber in such a manner that the gap width of the radial gap changes during a swerving movement of the contact body in the axial direction and/or during a deflection movement of the contact body in the radial direction. Alternatively or additionally, the portioning rotor is arranged in the portioning chamber in such a manner that the gap widths of the axial gaps change during a swerving movement of the contact body in the axial direction and/or during a swerving movement of the contact body in the radial direction. A radial swerving movement of the contact body can therefore lead to a widening of the axial gaps. The radial swerving movement can be supplemented by an axial swerving movement of the contact body, which leads to a further widening of the axial gap on one side of the contact body.

In another preferred embodiment of the granulate portioner according to the invention, at least one axially outer edge of the contact body is inclined outwardly, such that the axial gap between the axially outer edge of the contact body and a partial area of the shell surface axially bounding the portioning chamber, at least in sections, increases together with the radial gap during a radially inwardly directed swerving movement of the contact body. The axial outer edge of the contact body thus extends at an angle to a plane which is orthogonal to the axis of rotation of the portioning rotor. The at least one axially outer edge of the contact body thus slopes inward laterally outward in the radial direction. Preferably, the axially outer edges of the contact body located on both sides are each inclined outwardly, such that the axial gaps between the axially outer edges of the contact body and the partial areas of the shell surface axially bounding the portioning chamber, at least in sections, increase together with the radial gap during a radially inwardly directed swerving movement of the contact body.

It is further advantageous to have a granulate portioner according to the invention in which at least one partial area of the shell surface axially delimiting the portioning chamber at least in sections is inclined outwardly, so that the axial gap between the axially outer edge of the contact body and the partial area of the shell surface axially delimiting the portioning chamber at least in sections increases together with the radial gap during a radially inwardly directed swerving movement of the contact body. The partial area of the shell surface axially bounding the portioning chamber at least in sections is thus inclined relative to a plane which is orthogonal to the axis of rotation of the portioning rotor. The partial area of the lateral surface that delimits the portioning chamber at least in portions thus slopes inward laterally outward in the radial direction. Preferably, the partial areas of the shell surface axially bounding the portioning chamber at least in portions on both sides are each inclined outwardly, such that the axial gaps between the axially outer edges of the contact body and the partial areas of the shell surface axially bounding the portioning chamber at least in portions increase together with the radial gap during a radially inwardly directed swerving movement of the contact body.

In another preferred embodiment of the granule portioner according to the invention, the contact body is connected to a hub of the portioning rotor via a connection of a portioning wing. The connecting link can be part of the radial suspension or form the radial suspension itself. The connecting link preferably has a smaller width, i.e. a smaller extension in the axial direction, than the contact body. The width of the connecting link is preferably no more than half the width of the contact body. The connecting link is thus narrower than the contact body, such that the connecting link encounters a smaller number of granules during the rotational movement. In this manner, the formation of cross-grain impacts in the circumferential direction is prevented or at least considerably reduced.

The granulate portioner according to the invention is further advantageously embodied in that the portioning chamber has an inlet opening via which granulate can enter the portioning chamber, wherein the inlet opening is arranged in a side wall of the portioning chamber laterally bounding the portioning chamber on an inlet side. The granules therefore flow into the portioning chamber from the side. The side walls laterally bounding the portioning chamber are preferably designed to be flat or free of curvature. The portioning chamber is preferably laterally bounded by two opposing side walls, wherein the opposing side walls are arranged parallel to one another.

In another preferred embodiment of the granule portioner according to the invention, the connecting link is largely or completely arranged on a chamber side of the portioning chamber opposite the inlet side. Due to this arrangement of the connecting link, the axial distance between the inlet opening and the connecting link is comparatively large, so that the connecting link does not move directly past the inlet opening during the rotational movement of the portioning rotor. A shear point at the inlet opening that causes jamming is avoided. In the axial clearance between connecting link and inlet opening, granule jamming in the area of the edges of the inlet opening is avoided. In addition, there is a considerable reduction in wear during operation of the granulate portioner. Fewer cross-grain impacts occur because the granules are less likely to be hit by the connecting link. This significantly reduces the number of granules that unintentionally leave the portioning chamber between two granule portions. The connecting link preferably has an elongated basic shape.

In a particularly preferred embodiment of the granulate portioner according to the invention, the radially outer edge of the inlet opening has a distance from the circular path of the contact body which increases in the direction of rotation of the portioning rotor. The inlet opening is preferably located in an area of the side wall that is not or only partially swept by the contact body. Since the inlet opening is partially swept, it is advantageous if the outer edge of the inlet opening is radially recessed so that, viewed in the direction of rotation, no shear edge results when the end of the inlet opening is swept. The radially outer edge of the inlet opening has a shallow rising angle in the direction of rotation of the portioning rotor. A continuous transition is thus created between an area of the inlet opening that is swept by the contact surface and the area that is not swept.

In another embodiment, the wall of the housing of the granule portioner axially and/or radially delimiting the portioning chamber can be equipped with a housing-side deflection mechanism as an alternative to or in addition to the rotor-side deflection mechanism on the portioning rotor. For example, the side wall is configured to perform axial swerving movements. Furthermore, the circumferential shell surface can be configured to perform radial and/or axial swerving movements.

The object underlying the invention is further solved by an agricultural dispensing device of the type mentioned at the outset, wherein at least one granulate portioner of the agricultural dispensing device according to the invention is designed according to one of the embodiments described above. Thus, with respect to the advantages and modifications of the agricultural dispensing device according to the invention, reference is made to the advantages and modifications of the granule portioner according to the invention.

The object underlying the invention is further solved by a method of the kind mentioned at the beginning, wherein the contact body temporarily leaves the circular path during the rotational movement of the portioning rotor by means of a deflection mechanism of the portioning rotor within the scope of the method according to the invention, in order to dissolve or prevent jamming between the portioning rotor and granules. The method for producing granule portions is preferably performed by means of a granule portioner according to one of the embodiments described above. With regard to the advantages and modifications of the method according to the invention, reference is thus made to the advantages and modifications of the granulate portioner according to the invention.

Preferred embodiments of the invention are explained and described in more detail below with reference to the accompanying drawings, in which.

Figure 1:
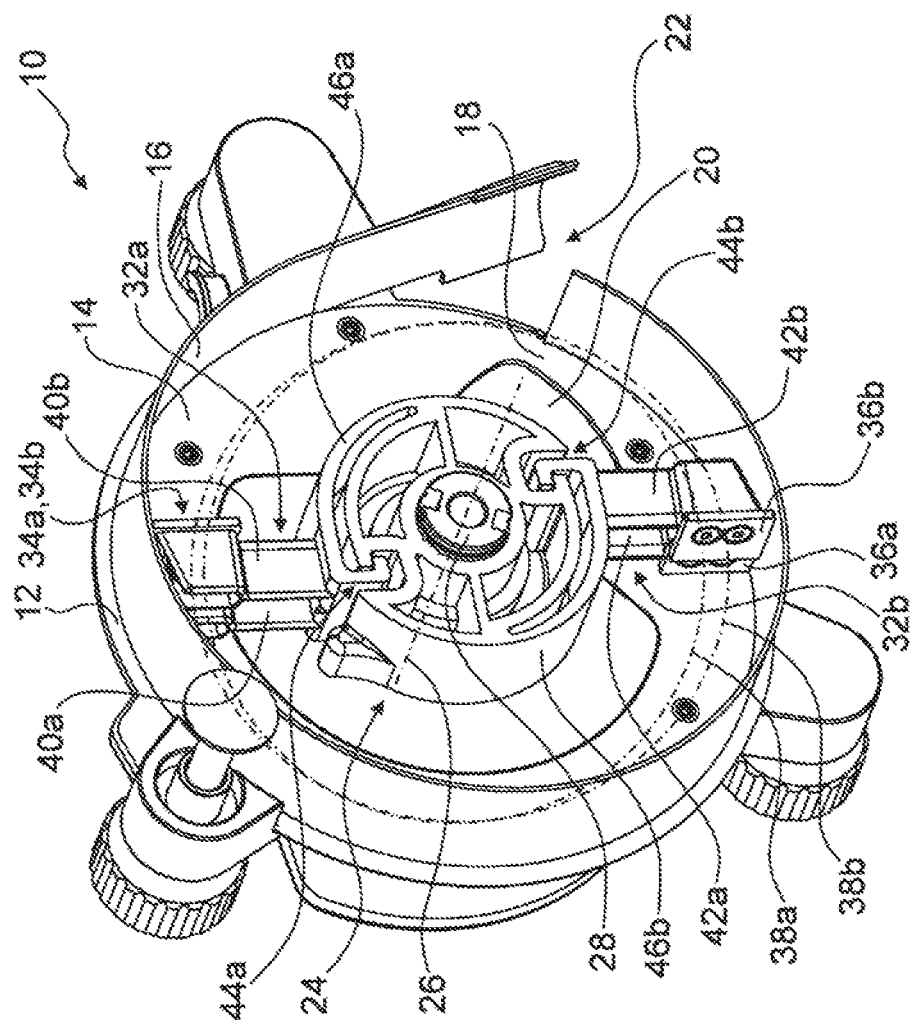
FIG. 1 shows an embodiment of the granulate portioner according to the invention in a perspective view.
Figure 2:
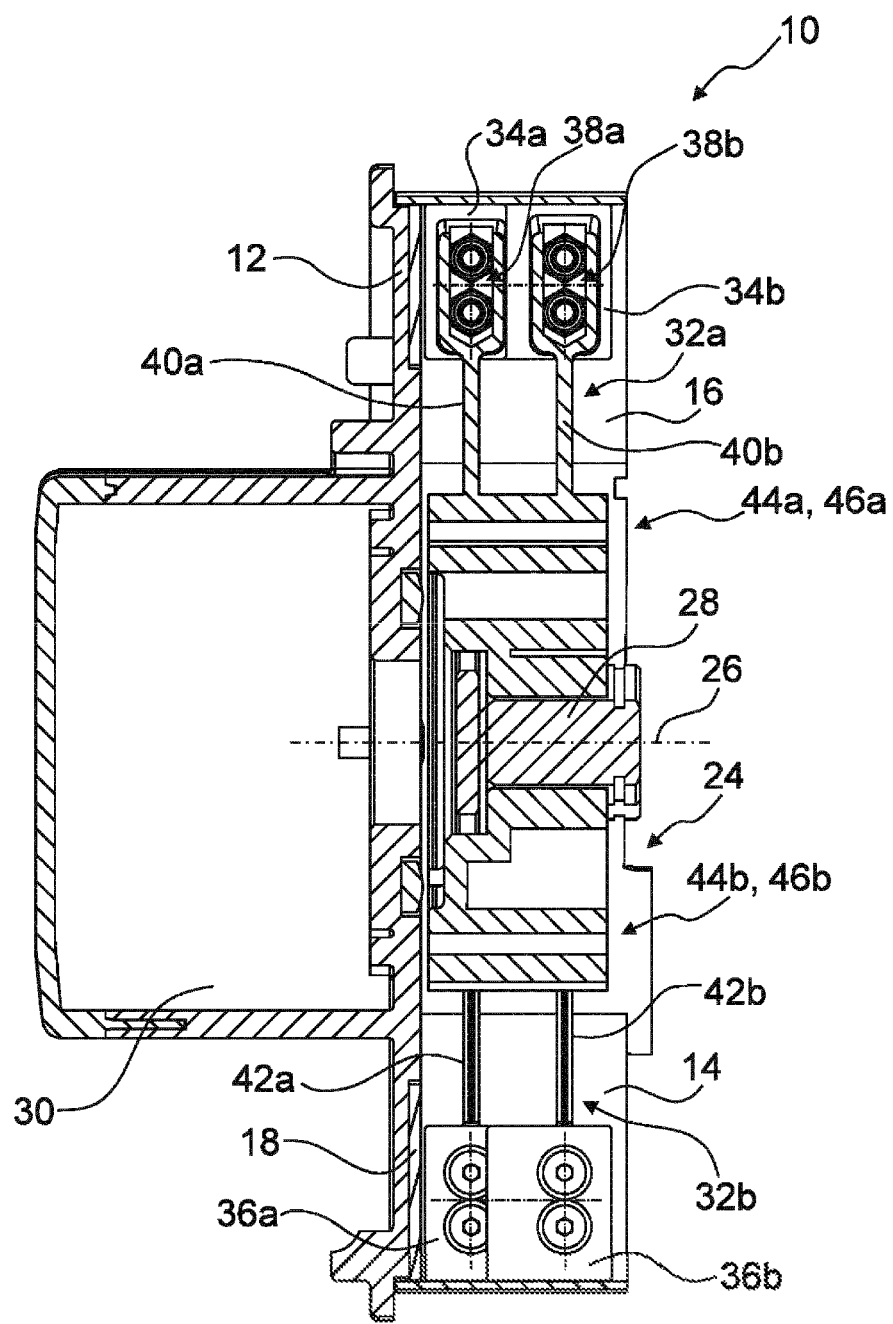
FIG. 2 shows a sectional view of the granulate portioner shown in FIG. 1.

FIGS. 1 and 2 show a granulate portioner 10, which can be used to produce fertilizer portions. The granulate portioner 10 is thus a fertilizer portioner.

The granulate portioner 10 has a housing 12 in which a portioning chamber 14 is located. The portioning chamber 14 is bounded axially, i.e. laterally, by side walls 18. The boundary of the portioning chamber 14 in the radial direction is provided by a sectional circumferential shell surface 16. The shell surface 16 is interrupted in one area by the outlet opening 22.

Granule portions 10 are formed in the portioning chamber 14 during operation of the granulate portioner. For this purpose, a portioning rotor 24 is arranged in the portioning chamber 14, which performs a rotational movement about the axis of rotation 26 during operation of the granulate portioner 10. The portioning rotor 24 is connected via the hub 28 to a rotor drive 30, which rotationally drives the portioning rotor 24.

The portioning rotor 24 has two opposing portioning wings 32a, 32b. The portioning wing 32a comprises two contact bodies 34a, 34b that move along circular paths 38a, 38b during a rotational movement of the portioning rotor 24. The portioning wing 32b comprises two contact bodies 36a, 36b which also move along circular paths 38a, 38b during a rotational movement of the portioning rotor 24. During the rotational movement of the portioning rotor 24, the contact bodies 34a, 34b, 36a, 36b bring together the granules G in the portioning chamber 14 to form granule portions. The granules G enter the portioning chamber 14 of the granule portioner 10 via the inlet opening 20.

Contact bodies 34a, 34b are connected to hub 28 via connecting links 40a, 40b and radial spring 46a. The contact bodies 36a, 36b are connected to the hub 28 via the connecting links 42a, 42b and the radial spring 46b. The connecting links 40a, 40b, 42a, 42b and the radial springs 46a, 46b are components of a deflection mechanism of the portioning rotor 24. The deflection mechanism of the portioning rotor 24 allows the contact bodies 34a, 34b, 36a, 36b to temporarily leave the circular paths 38a, 38b during the rotational movement of the portioning rotor 24 for breaking and/or avoiding jamming between the portioning rotor 24 and granules G. The contact bodies 34a, 34b, 36a, 36b can thus perform a swerving movement, wherein the contact bodies 34a, 34b, 36a, 36b briefly leave the respective circular path 38a, 38b when performing the swerving movement. The circular paths 38a, 38b in this case are circular paths. The granules G, which are brought together by the contact bodies 34a, 34b, 36a, 36b to form granule portions, are fertilizer granules.

The contact bodies 34a, 34b and the contact bodies 36a, 36b each form contact body pairs. The contact bodies 34a, 34b, 36a, 36b of a pair of contact bodies are deflected together during a radial swerving movement, which is made possible by the radial springs 46a, 46b. Due to the individual suspension of the contact bodies 34a, 34b, 36a, 36b via the connecting links 40a, 40b, 42a, 42b, the contact bodies 34a, 34b, 36a, 36b of a pair of contact bodies can perform swerving movements in the axial direction independently of one another. A lateral deflection of a contact body 34a, 34b, 36a, 36b therefore does not necessarily cause a lateral deflection of another contact body 34a, 34b, 36a, 36b. The contact bodies 34a, 34b and the contact bodies 36a, 36b overlap in portions in the axial direction. The swerving movement of the contact bodies 34a, 34b, 36a, 36b in the axial direction can temporarily cause a reduction in the overall width of the contact body pairs, resulting in the formation of a gap between a contact body 34a, 34b, 36a, 36b and a side wall 18 of the housing 12 or in a widening of the gap. Gap formation or widening can prevent and dissolve grain jams. Via the radial springs 46a, 46b, the contact bodies 34a, 34b, 36a, 36b can perform a radial swerving movement to leave the circular paths 38a, 38b during the rotational movement of the portioning rotor 24. Thus, the deflection mechanism of the pellet portioner 10 allows a radial and an axial swerving movement of the contact bodies 34a, 34b, 36a, 36b to leave the circular paths 38a, 38b during the rotational movement of the portioning rotor 24.

Figure 3:
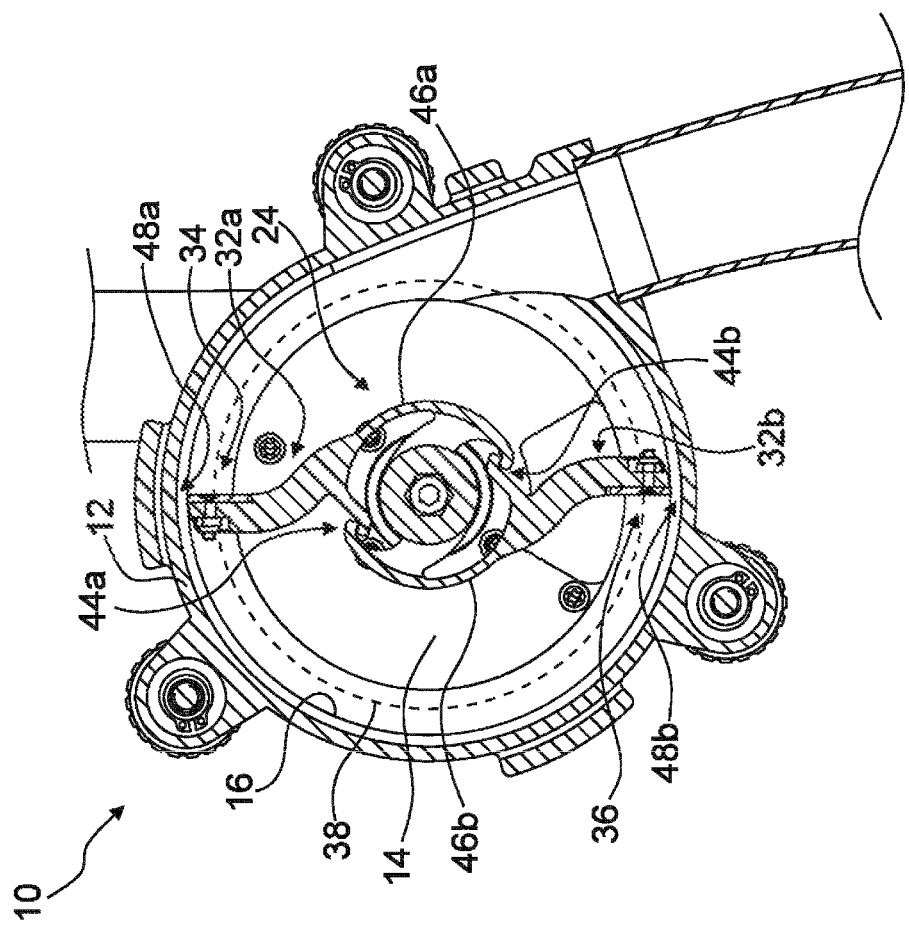
FIG. 3 shows an embodiment of the granulate portioner according to the invention in a sectional view.
Figure 4:
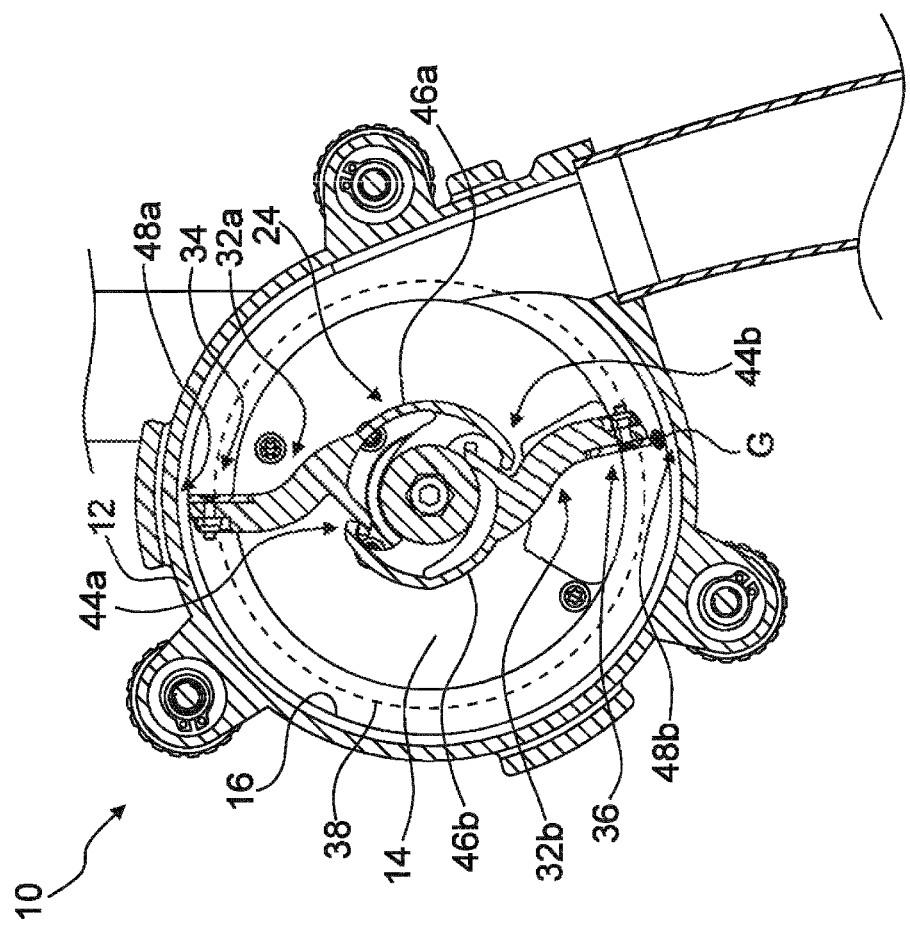
FIG. 4 shows a sectional view of the granulate portioner shown in FIG. 3 with a deflected contact body.

FIGS. 3 and 4 show a granulate portioner 10, wherein the contact bodies 34, 36 of the portioning rotor 24 in FIG. 3 move along the circular path 38. Unlike FIGS. 1 and 2, the portioning wings 32a, 32b each comprise only one contact body 34, 36. In the state shown in FIG. 4, the contact body 36 performs a swerving movement such that it has temporarily left the circular path 38. By leaving the circular path 38, jamming with the granule G can be prevented or resolved, since the widening of the radial gap 48b between the radially outer edge of the contact body 36 and the shell surface 16 radially bounding the portioning chamber 14 occurs. The radial gap 48a between the radially outer edge of the contact body 34 and the shell surface 16 remains unchanged.

The deflection mechanism of the granule portioner 10 further has stops 44a, 44b which ensure that the contact bodies 34, 36 are returned to the circular path 38 after performing a swerving movement. The springback of the portioning wings 32a, 32b is limited by the stops 44a, 44b so that after the granule G has passed, the original radial gap width is restored at the outer edge of the contact body 36. Further, the stops 44a, 44b thus also counteract centrifugal forces impacting the contact bodies 34, 36, so that the contact bodies 34, 36 do not leave the circular path 38 radially outward.

Figure 5:
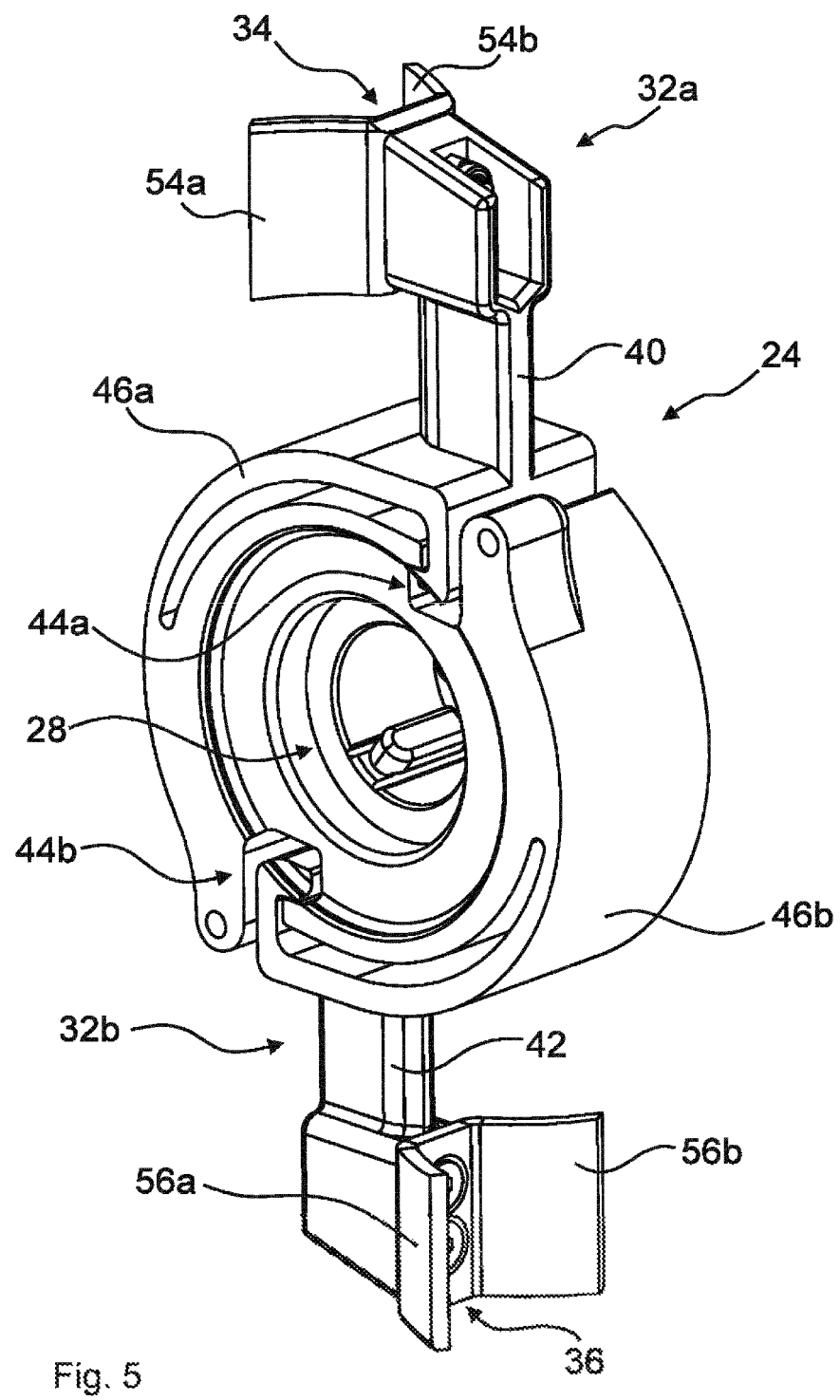
FIG. 5 shows a portioning rotor of a granule portioner according to the invention in a perspective view.
Figure 6:
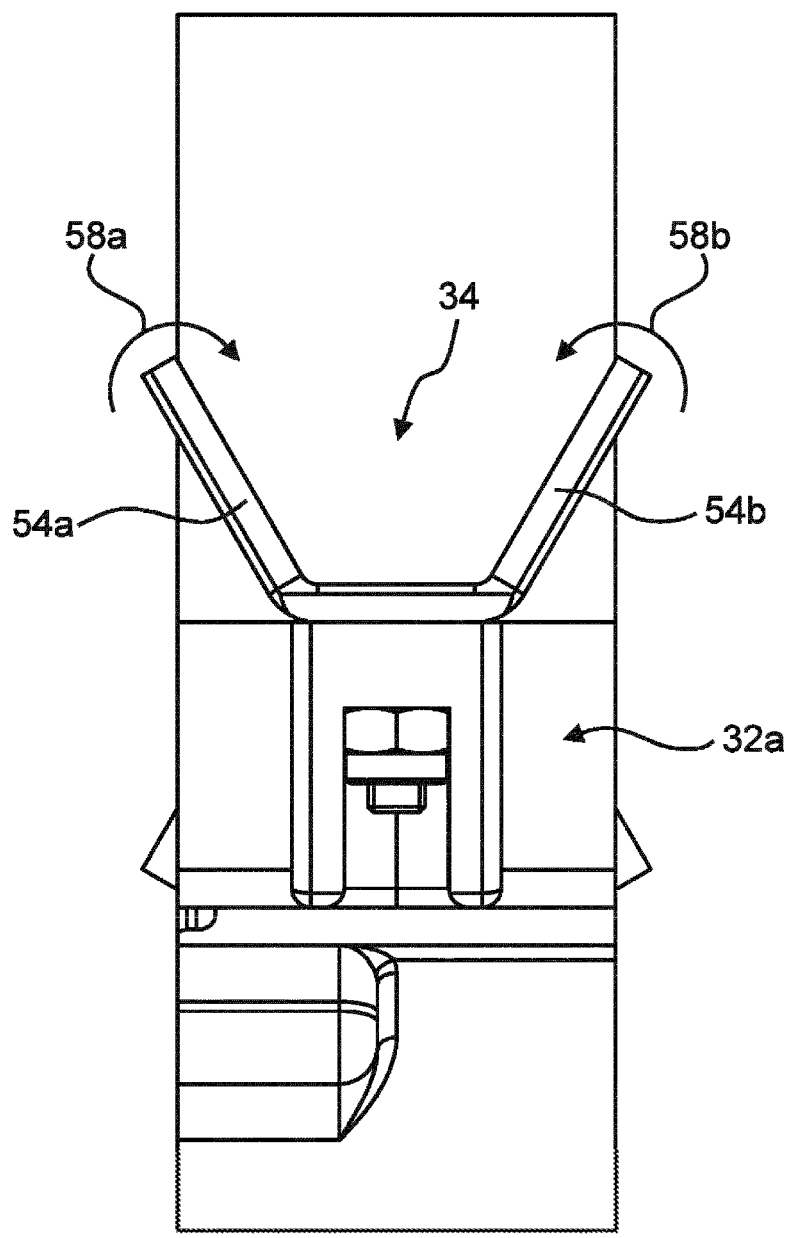
FIG. 6 shows a detailed illustration of the portioning rotor shown in FIG. 5.

FIGS. 5 and 6 show a portioning rotor 24 in which the contact bodies 34, 36 are connected to the hub 28 via the connecting links 40, 42 and the radial springs 46a, 46b.

The contact bodies 34, 36 each have resiliently movable side cheeks 54a, 54b, 56a, 56b on both sides, which allow an axial swerving movement of the contact bodies 34, 36 in the direction of a side wall 18 of the portioning chamber 14 to continue even after a side cheek 54a, 54b, 56a, 56b comes into contact with a side wall 18. In the illustrated embodiment, the contact bodies 34, 36 have a blade shape. The side cheeks 54a, 54b, 56a, 56b are designed from an elastic material, in this case spring steel, such that they can be resiliently pressed inwards. In the illustrated embodiment, the blade shape of the contact bodies 34, 36 does not have a back wall. Thus, in the event of wall contact due to an axial swerving movement of a contact body 34, 36, the side cheeks 54a, 54b, 56a, 56b can perform an inwardly directed spring movement 58a, 58b. After a jam has been cleared or the critical granule G has passed, a spring-induced restoring force ensures that the side cheeks 54a, 54b, 56a, 56b are moved back to their original position.

Figure 7:
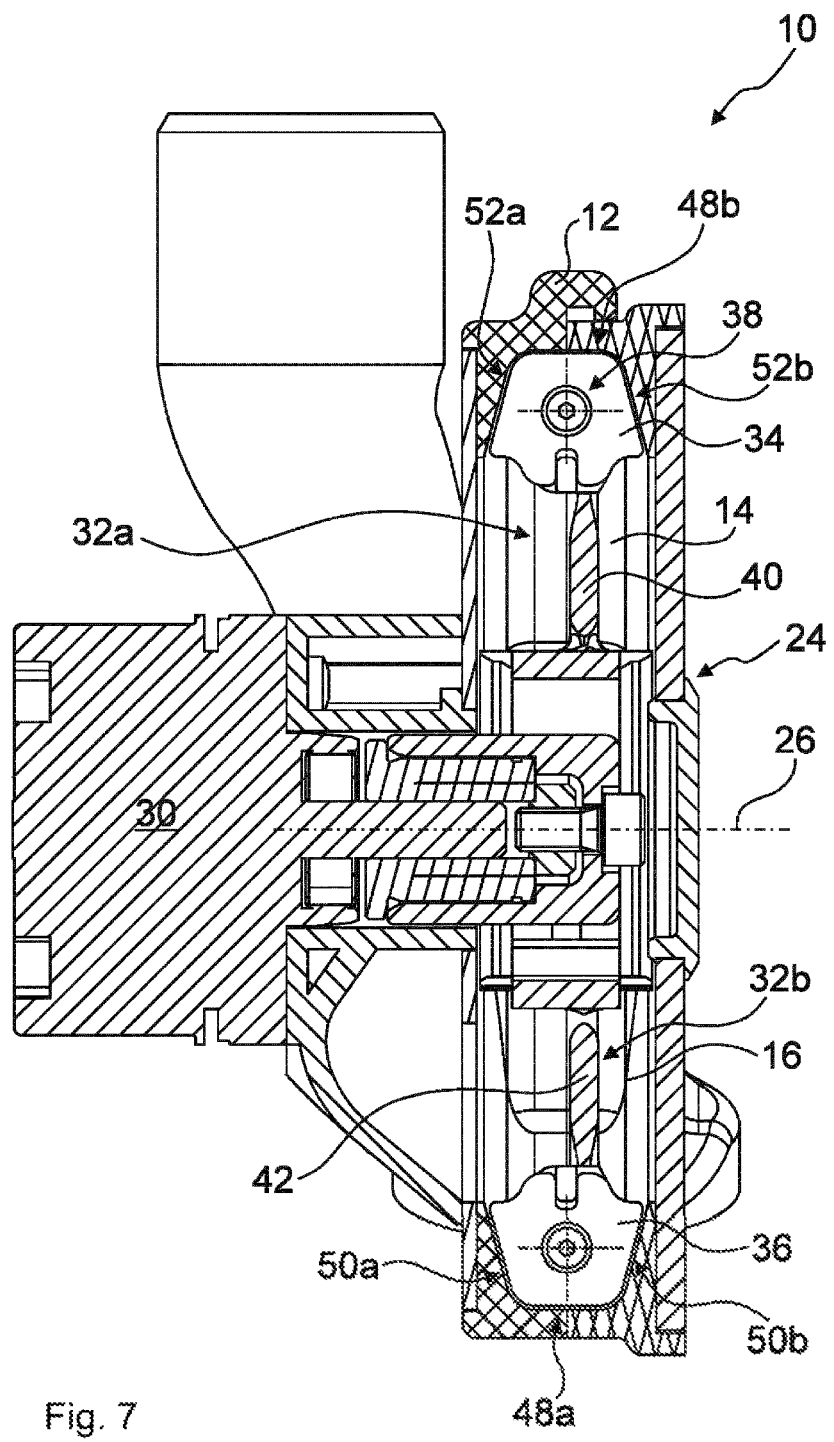
FIG. 7 shows an embodiment of the granulate portioner according to the invention in a sectional view.
Figure 8:
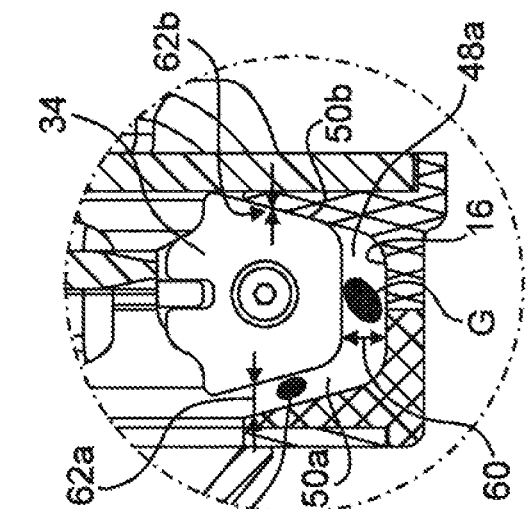
FIG. 8 shows a contact body of the granulate portioner shown in FIG. 7.

FIG. 7 shows a granulate portioner 10 in which the portioning chamber 14 is radially and axially bounded in the environment of the circular path 38 of the contact bodies 34, 36 by a partially circumferential shell surface 16. Taking FIG. 8 into account, it can be seen that the portioning rotor 24 is arranged in the portioning chamber 14 in such a manner that radial gaps 48a, 48b are formed between the radially outer edges of the contact bodies 34, 36 and the partial area of the shell surface 16 radially bounding the portioning chamber 14 during a rotational movement of the portioning rotor 24. Further, the portioning rotor 24 is arranged in the portioning chamber 14 in such a manner that axial gaps 50a, 50b, 52a, 52b are formed between the axially outer edges of the contact bodies 34, 36 and the partial areas of the shell surface 16 axially bounding the portioning chamber 14 during a rotational movement of the portioning rotor 24. The outer edges of the contact bodies 34, 36 and the shell surface 16 extend parallel to one another. The axially outer edges of the contact bodies 34, 36 and the partial areas of the shell surface 16 axially bounding the portioning chamber 14 are inclined outward.

Figure 9:
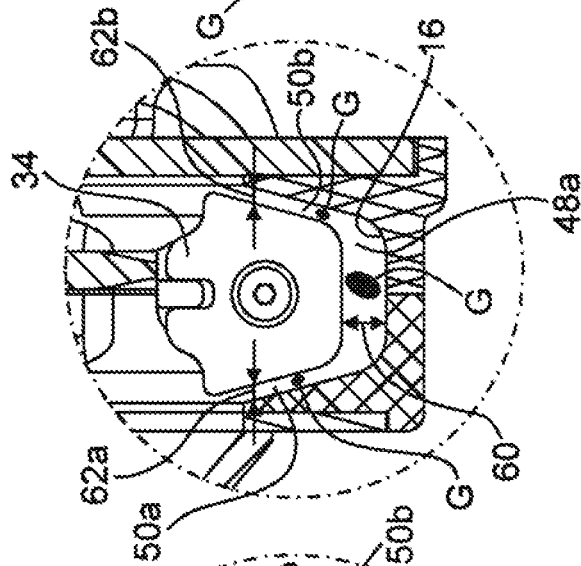
FIG. 9 shows a contact body of the granulate portioner shown in FIG. 7 during a swerving movement.

FIG. 9 shows that the portioning rotor 24 is arranged in the portioning chamber 14 in such a manner that the gap width 60 of the radial gap 48a changes when the contact body 34 undergoes a swerving movement in the radial direction. As the contact body 34 moves radially inward, the radial gap 48a widens. In this manner, grain jams at the radially outer edge of the contact body 34 can be resolved by a swerving movement. FIG. 9 also shows that the portioning rotor 24 is arranged in the portioning chamber 14 in such a manner that the gap widths 62a, 62b of the axial gaps 50a, 50b change when the contact body 34 undergoes a swerving movement in the radial direction. During a radially inward swerving movement of the contact body 34, the axial gaps 50a, 50b are enlarged.

Figure 10:
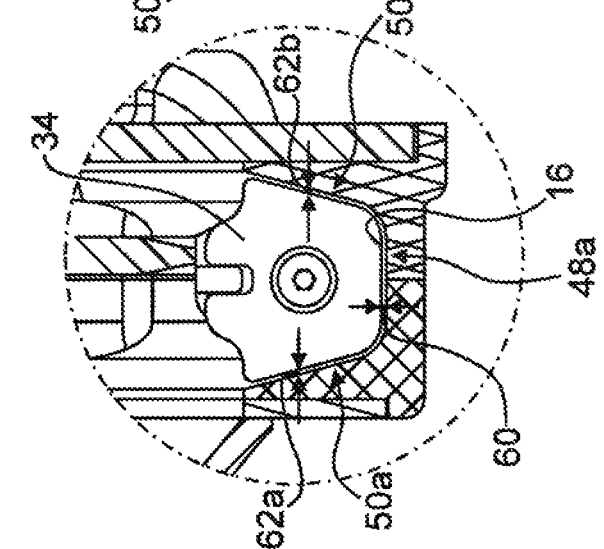
FIG. 10 shows a contact body of the granulate portioner shown in FIG. 7 during a swerving movement.
Figure 11:
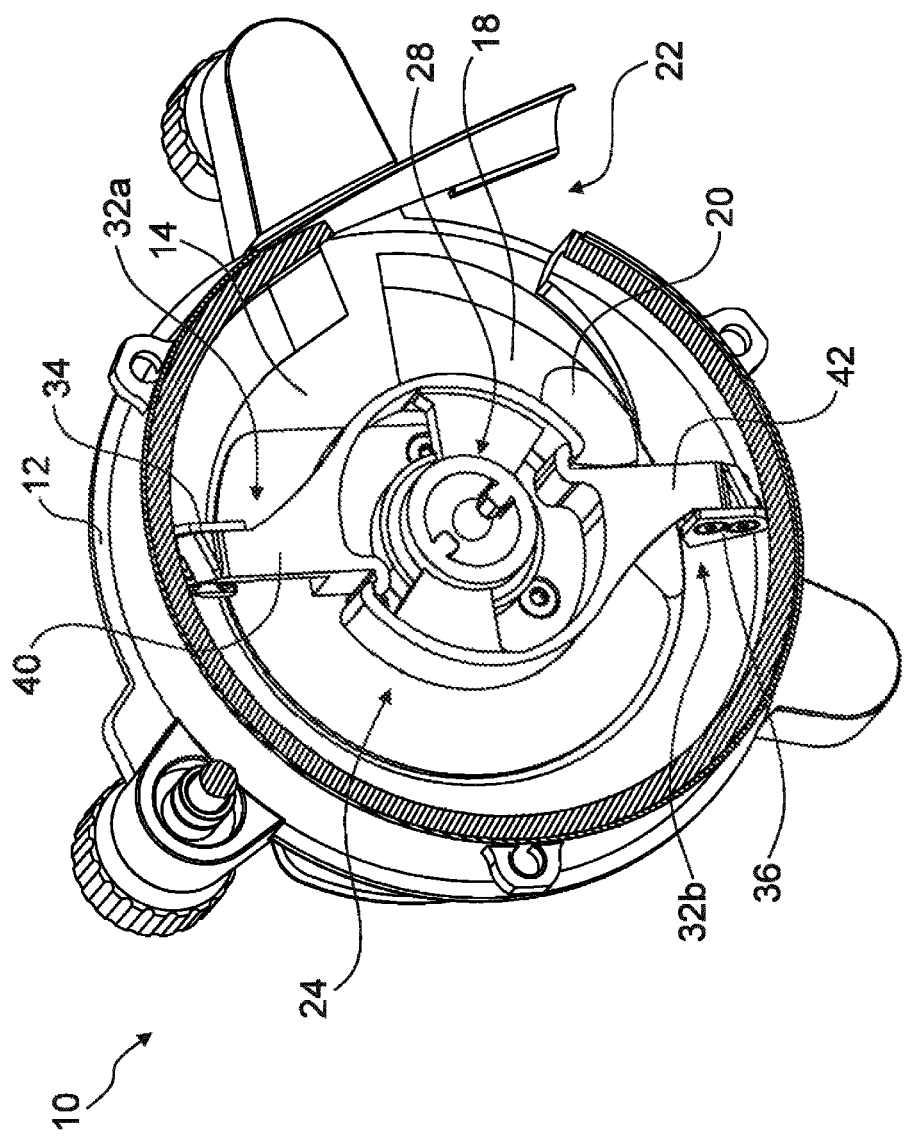
FIG. 11 shows an embodiment of the granulate portioner according to the invention in a perspective view.
Figure 12:
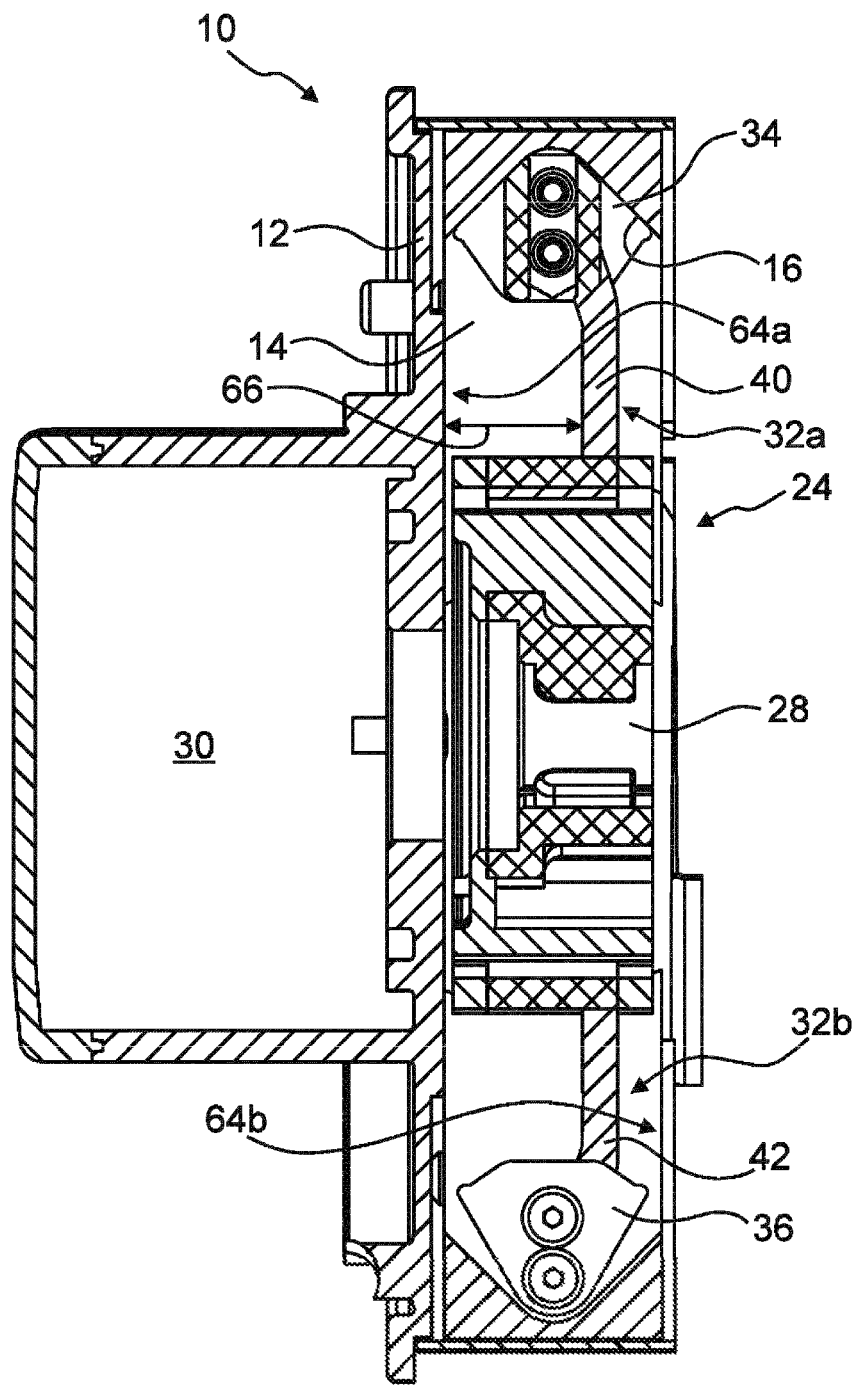
FIG. 12 shows a sectional view of the granulate portioner shown in FIG. 11.
Figure 13:
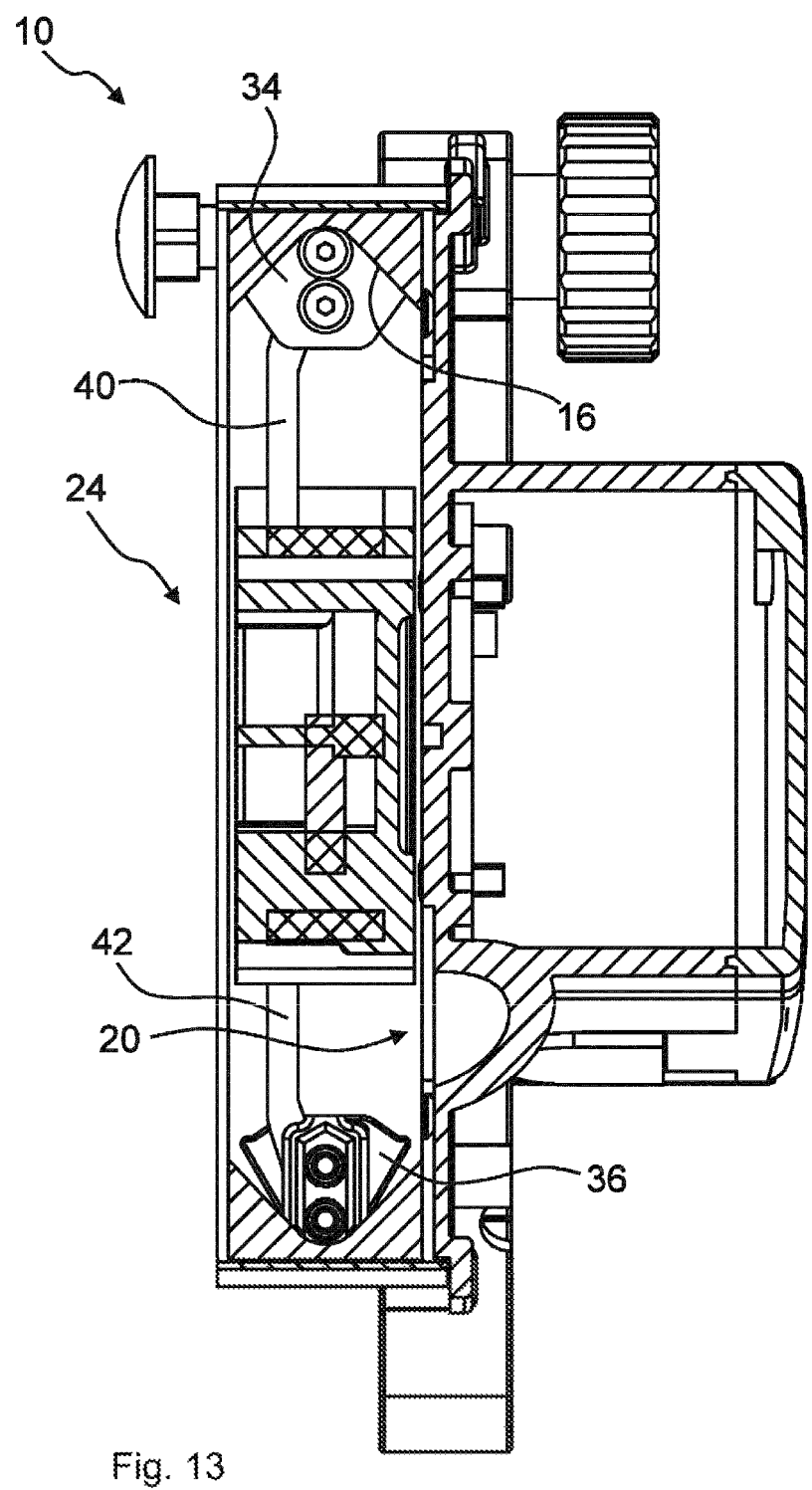
FIG. 13 shows the granulate portioner shown in FIG. 11 in a further sectional view.
Figure 14:
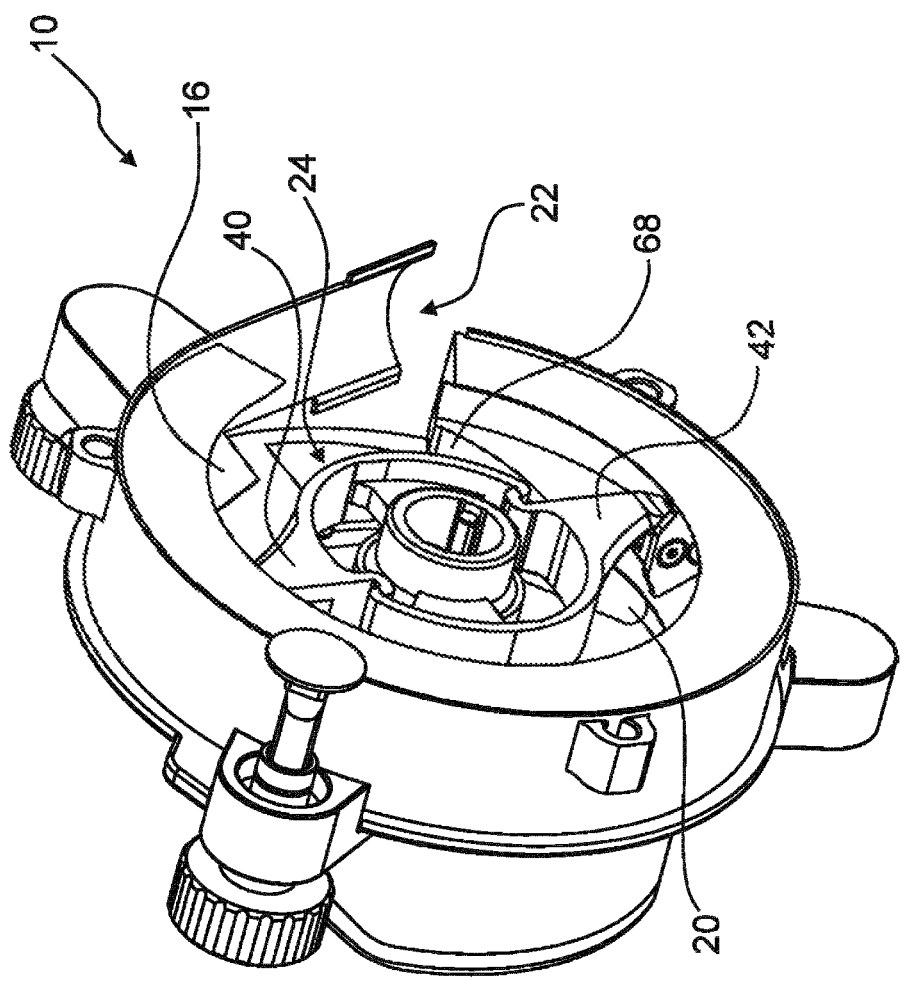
FIG. 14 shows a perspective view of the granulate portioner shown in FIG. 11.

FIG. 10 shows that the radial swerving movement of the contact body 34 can be combined with an additional axial swerving movement of the contact body 34. Due to the axially resilient connecting links 40, 42, the contact bodies 34, 36 can therefore also perform axial swerving movements to prevent or trigger grain jamming. During an axial swerving movement, the gap width 62b of one axial gap 50b is reduced, wherein the gap width 62a of the opposite axial gap 50a is simultaneously increased. Thus, jamming caused by granules G at the axially outer edges of the contact bodies 34, 36 can be resolved by a radial and/or by an axial swerving movement of the contact bodies 34, 36.

FIGS. 11 to 14 show a granulate portioner 10 in which the contact bodies 34, 36 are each connected to a hub 28 of the portioning rotor 24 via a connecting link 40, 42 of a portioning wing 32a, 32b. The connecting links 40, 42 have a smaller width, i.e. a smaller extension in the axial direction, than the contact bodies 34, 36. The width of the connecting links 40, 42 is less than half the width of the contact bodies 34, 36. The connecting links 40, 42 are designed to be so narrow that grain cross-blows caused by the connecting links 40, 42 are considerably reduced in the circumferential direction. This considerably reduces the number of granules G leaving the portioning chamber 14 between individual granule portions.

The portioning chamber 14 has an inlet opening 20 through which granules can enter the portioning chamber 14. The inlet opening 20 is arranged in a side wall 18 of the portioning chamber 14 laterally defining the portioning chamber 14 on an inlet side 64a. The connecting links 40, 42 are arranged entirely on a chamber side 64b of the portioning chamber 14 opposite the inlet side 64a. The axial spacing of the inlet opening 20 and the connecting links 40, 42 creates a clearance 66. Thus, the connecting links 40, 42 are not moved directly past the inlet opening 20 during the rotational movement of the portioning rotor 24. There is no shearing at the inlet opening 20, which could lead to jamming or additional wear of the inlet opening 20. The clearance 66 further prevents grain ricochets due to unintentional contact of the connecting links 40, 42 with granules G in the area of the inlet opening 20.

Further, the radially outer edge of the inlet opening 20 has a distance from the circular path 38 of the contact bodies 34, 36 that increases in the direction of rotation of the portioning rotor 24. A continuous transition is created between the area of the inlet opening 20 swept by the contact bodies 34, 36 and the area not swept by the contact bodies 34, 36.

The shell surface 16 of the granule portioner 10 further has a V-shaped cross-section. The V-shaped cross-section builds up continuously in the portion of the shell surface 16 located behind the outlet opening 22. This is converted via a crescent-shaped surface 68 in the vicinity of the outlet opening 22.

LIST OF REFERENCE SYMBOLS

10 Granulate portioner
12 Housing
14 Portioning chamber
16 Shell surface
18 Side wall
20 Inlet opening
22 Outlet opening
24 Portioning rotor
26 Axis of rotation
28 Hub
30 Rotor drive
32A,32b Portioning wing
34, 34a, 34b Contact body
36, 36a, 36b Contact body
38, 38a, 38b Circular paths
40, 40a, 40b Connecting links
42, 42a, 42b Connecting links
44a, 44b Stops
46a, 46b Radial springs
48a, 48b Radial gap
50a, 50b Axial gap
52a, 52b Axial gap
54a, 54b Side cheeks
56A, 56b Side cheeks
58a, 58b Spring movements
60 Gap width
62a, 62b Gap widths
64a, 64b Chamber side
66 Clearance
68 Surface
G Granules

The invention claimed is:

1. A granulate portioner for an agricultural dispensing device, comprising
   a portioning chamber for forming granular portions; and
   a portioning rotor arranged in the portioning chamber, the portioning rotor having at least one contact body, wherein the contact body is configured to move along a circular path during a rotational movement of the portioning rotor and to bring together granules located in the portioning chamber to form a granule portion;
   wherein the portioning rotor has a deflection mechanism which allows the contact body to temporarily leave the circular path during the rotational movement of the portioning rotor for disengaging and/or avoiding jamming between the portioning rotor and granules.

2. The granulate portioner according to claim 1,
   wherein the deflection mechanism allows a radial swerving movement and/or an axial swerving movement of the contact body to leave the circular path during a rotational movement of the portioning rotor.

3. The granulate portioner according to claim 2,
   wherein the deflection mechanism has a radial spring connected to the contact body which allows radial swerving movement of the contact body to leave the circular path during rotational movement of the portioning rotor.

4. The granulate portioner according to claim 1,
   wherein the portioning rotor comprises at least one portioning wing, wherein the portioning wing has two contact bodies movable relative to one another, wherein the deflection mechanism allows axial swerving movements of the two contact bodies, by which the two contact bodies temporarily leave their circular path during a rotational movement of the portioning rotor.

5. The granulate portioner according to claim 1,
   wherein the contact body has elastically deformable or resiliently movable side cheeks on one or both sides, which allow an axial swerving movement of the contact body in the direction of a side cheek of the portioning chamber to continue even after a side cheek has come into contact with a side cheek.

6. The granulate portioner according to claim 1,
   wherein the portioning chamber in the environment of the circular path is bounded radially and/or axially at least in portions by an at least partially circumferential shell surface, wherein the portioning rotor is arranged in the portioning chamber in such a manner that
   a radial gap is formed between the radially outer edge of the contact body and a partial area of the shell surface radially delimiting the portioning chamber at least in portions and/or between the axially outer edges of the contact body and partial areas of the shell surface axially delimiting the portioning chamber at least in portions, and partial areas of the shell surface axially delimiting the portioning chamber at least in sections, axial gaps result during the rotational movement of the portioning rotor, and
   the gap width of the radial gap and/or the axial gaps changes during a swerving movement of the contact body.

7. The granulate portioner according to claim 6,
   wherein the portioning rotor is arranged in the portioning chamber in such a manner that
   the gap width of the radial gap changes during a swerving movement of the contact body in the axial direction and/or during a swerving movement of the contact body in the radial direction; and/or the gap widths of the axial gaps change during a swerving movement of the contact body in the axial direction and/or during a swerving movement of the contact body in the radial direction.

8. The granulate portioner according to claim 6,
wherein at least one axially outer edge of the contact body is inclined outwardly in such a manner that the axial gap between the axially outer edge of the contact body and a partial area of the shell surface axially bounding the portioning chamber at least in portions increases together with the radial gap during a radially inward swerving movement of the contact body.

9. The granulate portioner according to claim 6,
wherein at least one partial area of the shell surface axially delimiting the portioning chamber at least in portions is inclined outwardly such that the axial gap between the axially outer edge of the contact body and the partial area of the shell surface axially bounding the portioning chamber at least in portions increases together with the radial gap during a radially inward swerving movement of the contact body.

10. The granulate portioner according to claim 1,
wherein the contact body is connected to a hub of the portioning rotor via a connecting link of a portioning wing.

11. The granulate portioner according to claim 1,
wherein the portioning chamber has an inlet opening via which granulate enters the portioning chamber, wherein the inlet opening is arranged in a side wall of the portioning chamber laterally bounding the portioning chamber on an inlet side.

12. The granulate portioner according to claim 10,
wherein the connecting link is arranged mostly or completely on a chamber side of the portioning chamber opposite the inlet side.

13. The granulate portioner according to claim 11,
wherein the radially outer edge of the inlet opening has a distance from the circular path of the contact body which increases in the direction of rotation of the portioning rotor.

14. An agricultural dispensing device for dispensing granulate portions onto an agricultural land, the agricultural dispensing device comprising:
a plurality of granulate portioners for producing granulate portions; and
at least one granulate portioner comprising: a portioning chamber for forming granular portions; and a portioning rotor arranged in the portioning chamber, the portioning rotor having at least one contact body, wherein the contact body is configured to move along a circular path during a rotational movement of the portioning rotor and to bring together granules located in the portioning chamber to form a granule portion; wherein the portioning rotor has a deflection mechanism which allows the contact body to temporarily leave the circular path during the rotational movement of the portioning rotor for disengaging and/or avoiding jamming between the portioning rotor and granules.

15. A method of producing granule portions by means of a granule portioner, the method comprising:
introducing granules into a portioning chamber of the granule portioner,
rotationally driving a portioning rotor disposed in the portioning chamber; and
bringing together granules located in the portioning chamber by means of a contact body of the portioning rotor moving along a circular path during a rotary movement of the portioning rotor;
wherein the contact body temporarily leaves the circular path during the rotational movement of the portioning rotor by means of a deflection mechanism of the portioning rotor in order to release or prevent jamming between the portioning rotor and granules.

\* \* \* \* \*